Figure 1:
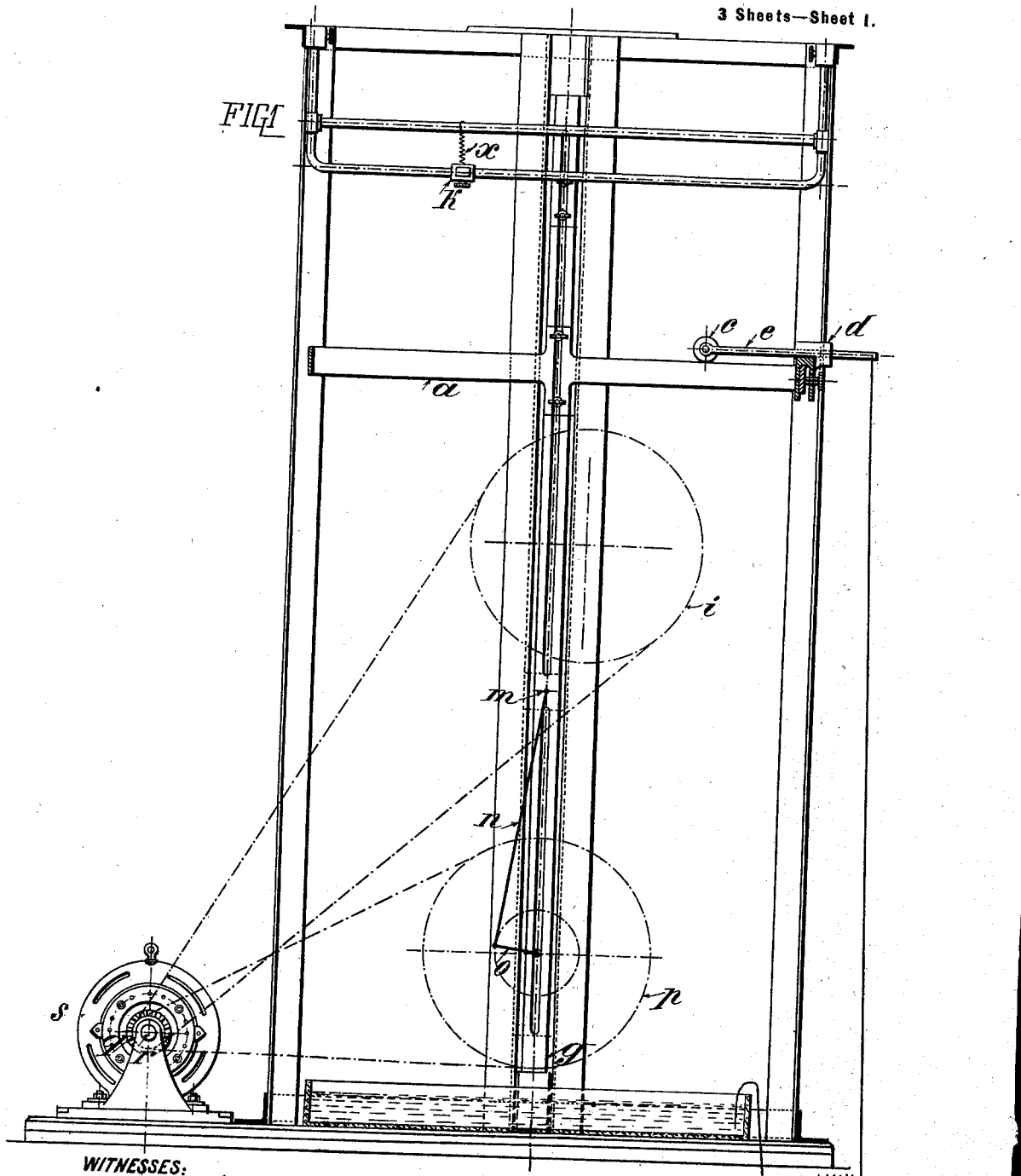

No. 670,688. Patented Mar. 26, 1901.
J. A. RIVIÈRE.
MASSAGE APPARATUS.
(Application filed Apr. 12, 1899.)

(No Model.) 3 Sheets—Sheet 1.

WITNESSES:

INVENTOR
Joseph A. Rivière
BY
ATTORNEYS.

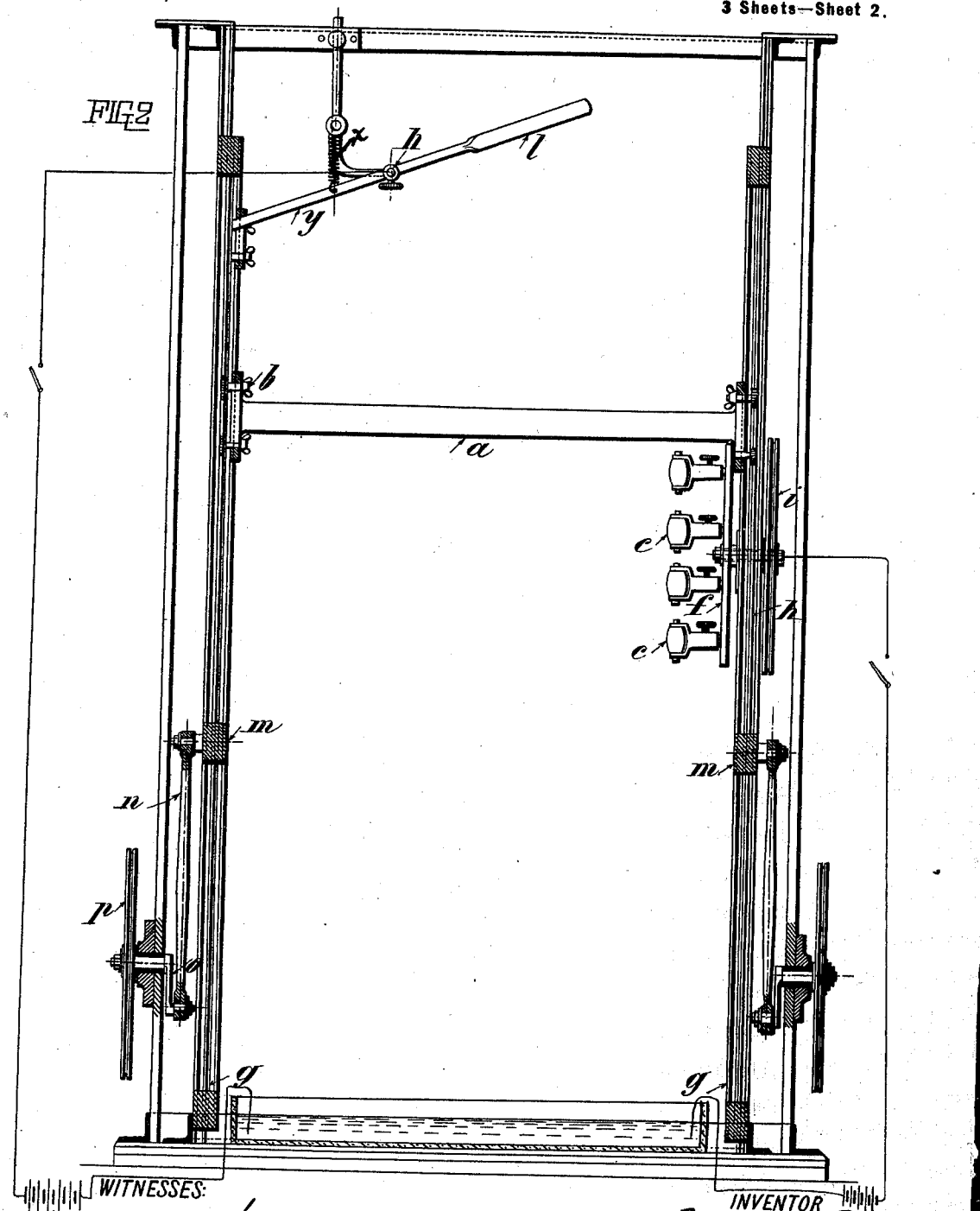

No. 670,688. Patented Mar. 26, 1901.
J. A. RIVIÈRE.
MASSAGE APPARATUS.
(Application filed Apr. 12, 1899.)
(No Model.) 3 Sheets—Sheet 3.
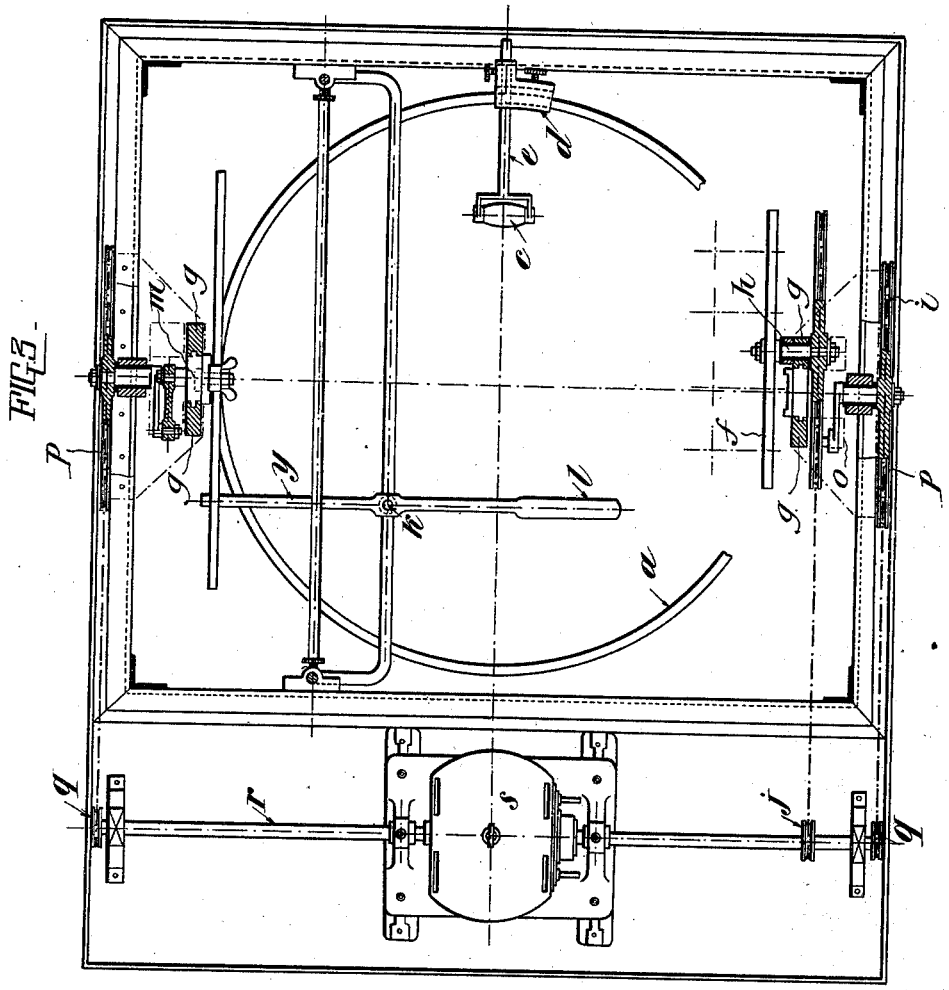
WITNESSES:
INVENTOR
Joseph A. Rivière
BY
ATTORNEYS.

UNITED STATES PATENT OFFICE.

JOSEPH ALEXANDRE RIVIÈRE, OF PARIS, FRANCE.

MASSAGE APPARATUS.

SPECIFICATION forming part of Letters Patent No. 670,688, dated March 26, 1901.

Application filed April 12, 1899. Serial No. 712,784. (No model.)

*To all whom it may concern:*

Be it known that I, JOSEPH ALEXANDRE RIVIÈRE, a citizen of the Republic of France, and a resident of Paris, in the Republic of France, have invented certain new and useful Improvements in Massage Apparatus, of which the following is a specification.

This invention relates to a novel apparatus for automatically effecting a general massage of the body.

The invention has for its object the substitution of a mechanical and general massage for manipulations which can necessarily be only partial and of small duration, whatever the strength of the operator may be.

In order that my invention may be readily understood, I have illustrated the same in the accompanying drawings, in which—

Figure 1 is a side elevation of the apparatus, partly in section. Fig. 2 is a sectional front elevation, and Fig. 3 is a plan view.

Similar letters of reference indicate corresponding parts.

My apparatus consists, essentially, of a framework, of iron or other suitable material, which serves as a support for the different parts, both mechanical and electrical, which are employed. In the direction of one of the axes of this framework are arranged two fixed vertical slideways $g$, between the rails of which two movable slide-blocks $m$, of copper or bronze, are adapted to be displaced, said blocks receiving a vertical reciprocating movement. This movement is obtained by means of connecting-rods $n$ and cranks $o$, driven from pulleys $p$. The two grooved pulleys $p$ are driven by means of belts from pulleys $q$, fixed upon the shaft $r$, upon which is also mounted the armature of the dynamo $s$. Upon the two movable slide-blocks $m$ I fix one or more annular parts or rings $a$, the position of which may be adjusted by means of set-screws $b$. Upon these parts or rings $a$ I fix a certain number of massage rollers or rubbers $c$. These rollers are mounted in a double socket $d$ by means of a rod $e$. One of the sockets is capable of displacement upon the annular part or ring and may be fixed at any point of the aforesaid rod $e$, entering the other socket, along which it is also capable of displacement and of being fixed at any desired point. Owing to this special method of mounting the position to be given to the massage-rollers $c$ is capable of being regulated with great exactness. These massage-rollers may be charged with electricity from any suitable source, as shown in Fig. 1, for instance.

At a certain point upon the slide-blocks $m$ I fix a plate $f$, which carries four massage-rollers $c$. These rollers are also mounted upon rods in such a manner that the position of each one of them can be regulated at will. The plate $f$ is mounted upon a short shaft $h$, journaled at one side of the apparatus in one of the guide-rails $g$ and carrying a grooved pulley $i$, which receives motion by a suitable transmission from the pulley $j$, located upon the shaft $r$ of the dynamo $s$, as shown more clearly in Fig. 3. It will be understood that the massage-rollers of the plate $f$, like those mounted upon the annular parts or rings $a$, may be in communication with a suitable source of electricity.

At the upper portion of the framework of the apparatus is provided a fixed axis $k$, around which two paddles $l$ (one only shown in the drawings) are capable of oscillating. These paddles tend to fall under the influence of strong springs $x$, which are stretched by means of a lever $y$, fixed upon the left-hand slide-block $m$, Fig. 2. It will readily be understood that the position of this lever and also the tension of the springs is capable of being readily adjusted. The lever $y$ may either be charged with electricity or not.

The operation of the apparatus is as follows: The person who is to undergo either general or local massage is placed within the apparatus. The annular parts $a$ are arranged in front of the parts to be massaged by hand. The position of the massage-rollers $c$ is then regulated. Electric current is then caused to enter the dynamo, reciprocating movement being imparted to the slide-blocks $m$, thereby operating the annular part and the rollers which rub the parts to be massaged. If the feet of the patient are placed in water and a pole of a source of electricity arranged in this water, the other pole being in communication with the rollers to be charged with electricity, electromechanical massage is obtained which is most beneficial in its action in certain complaints. If it is desired to effect abdominal massage, the position of the aforesaid plate $f$ is regulated in such a manner as to bring it opposite to this part of the patient. Massage of the shoulders may be obtained by means of the paddles $l$. This massage is obtained by tapping, the amplitude and force of the strokes being regulated by the tension of the springs $x$. The vibrators may be arranged at any suitable points of the apparatus. In order to obtain general massage of the body, it is only necessary to place all the massage parts or instruments in contact with the patient and to impart the necessary motion to the apparatus.

As will be readily understood, it is sometimes necessary to massage patients who are incapable of maintaining a vertical position. My apparatus may be readily arranged horizontally in order to permit of the massage of persons while lying down in a bath or not, as desired.

Having thus described my invention, what I claim as new, and desire to secure by Letters Patent, is—

1. An apparatus for use in massage treatment, the same consisting of a suitable frame provided with vertical guideways, slides guided in said ways, a transverse ring supported by said slides, between the sides of the frame, a rod fixed adjustably to and projecting into said ring, a massaging-rubber carried by said rod, and means for reciprocating said slides, substantially as set forth.

2. An apparatus for use in massage treatment, the same consisting of a suitable frame provided with guideways, slides guided in said ways, a transverse ring supported by said slides, between the sides of the frame, a massaging-rubber suitably supported by said ring, a rotary plate, a series of massaging-rubbers mounted on said plate, means for reciprocating said slides, and means for rotating said disk for conjoint operation of all the massaging-rubbers, substantially as set forth.

3. An apparatus for use in massage treatment, the same consisting of a suitable frame provided with longitudinal guideways, slides guided in said ways, a transverse ring supported by said slides, between the sides of the frame, a massaging-rubber suitably supported by said ring, paddles supported in position to work toward the said ring, said paddles being connected with said slides, and means for reciprocating said slides, substantially as set forth.

In testimony whereof I have signed this specification in the presence of two subscribing witnesses.

JOSEPH ALEXANDRE RIVIÈRE.

Witnesses:
 EMILE LEDREL,
 EDWARD P. MacLEAN.